(12) United States Patent
Cho (10) Patent No.: US 7,420,591 B2
(45) Date of Patent: Sep. 2, 2008

(54) OPTICAL DETECTOR OF PROJECTION TELEVISION

(75) Inventor: Eun Hyung Cho, Goomi-si (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 11/075,916

(22) Filed: Mar. 10, 2005

(65) Prior Publication Data

US 2005/0200702 A1 Sep. 15, 2005

(30) Foreign Application Priority Data

Mar. 11, 2004 (KR) ........................ 10-2004-0016470

(51) Int. Cl.
*H04N 17/02* (2006.01)
*H04N 3/22* (2006.01)

(52) U.S. Cl. .................... 348/191; 348/189; 348/745
(58) Field of Classification Search ................ 348/189, 348/191, 745–747, 806, 807
See application file for complete search history.

(56) References Cited

U.S. PATENT DOCUMENTS

| 5,022,725 | A | * | 6/1991 | Matsunami et al. ......... 359/726 |
| 5,361,020 | A | * | 11/1994 | Hedrick ..................... 315/369 |
| 5,883,476 | A | * | 3/1999 | Noguchi et al. ......... 315/368.12 |
| 6,124,969 | A | * | 9/2000 | Funazaki et al. ............. 359/456 |
| 6,219,011 | B1 | * | 4/2001 | Aloni et al. .................... 345/1.3 |
| 6,606,130 | B1 | * | 8/2003 | George ........................ 348/744 |
| 6,771,307 | B2 | * | 8/2004 | Waki et al. ................... 348/189 |
| 6,933,967 | B2 | * | 8/2005 | Doyle et al. ................. 348/189 |
| 6,964,500 | B2 | * | 11/2005 | Sakai ........................... 362/276 |
| 2003/0076450 | A1 | * | 4/2003 | Lee et al. ..................... 348/745 |
| 2003/0156229 | A1 | * | 8/2003 | Samman et al. ............. 348/745 |
| 2004/0080749 | A1 | * | 4/2004 | Lutz et al. .................... 356/405 |

FOREIGN PATENT DOCUMENTS

| EP | 0 703 714 A2 | 3/1996 |
| JP | 10-276445 | 10/1998 |

OTHER PUBLICATIONS

European Office Action dated Feb. 1, 2007.
European Office Action dated Jan. 29, 2008.

* cited by examiner

*Primary Examiner*—Victor R Kostak
(74) *Attorney, Agent, or Firm*—Ked & Associates, LLP (57) ABSTRACT

An optical detector is provided. The optical detector allows an auto-convergence control to be effectively made by cutting off external light incident to an optical sensor for use in the auto-convergence of a projection TV. The optical detector includes optical sensors and external light cut-off units. The optical sensors are positioned in an inside of the projection TV to receive test signals. The external light cut-off units are protruded to a direction to which the test signals are incident.

13 Claims, 15 Drawing Sheets

FIG.1

(Related art)

(Related art)

C: INCIDENT ANGLE
   OF TEST SIGNAL

FIG.8

OPTICAL DETECTOR OF PROJECTION TELEVISION

BACKGROUND OF THE INVENTION

1. Field of the Invention

The present invention relates to an optical detector, and more particularly, to an optical detector having external light cut-off units in order to increase a recognition rate for test signals incident to optical sensors used in an auto convergence of a projection television (TV).

2. Description of the Related Art

An image display apparatus starts from a small model such as a 14-inch analog TV and has developed up to a projection TV of more than 60-inch currently.

The projection TV is an apparatus so configured as to project red(R), green (G), blue (B) colors onto a screen using an each projection cathode-ray tube (PRT) to display images on a screen. Sensitivity quality of the projection TV includes: a white uniformity (W/U), a bright uniformity (B/U), convergence, focus, and distortion.

Here, the convergence denotes a phenomenon that R, G, B beams discharged from the PRT are gathered at one single point on a screen by a magnetic field of a deflection yoke. If the beams are not deflected as desired due to a malfunction of the deflection yoke or an influence of the magnetic field, a mis-convergence is generated and a color-biased phenomenon is generated on a screen as illustrated in FIG. 1.

Figure 1:
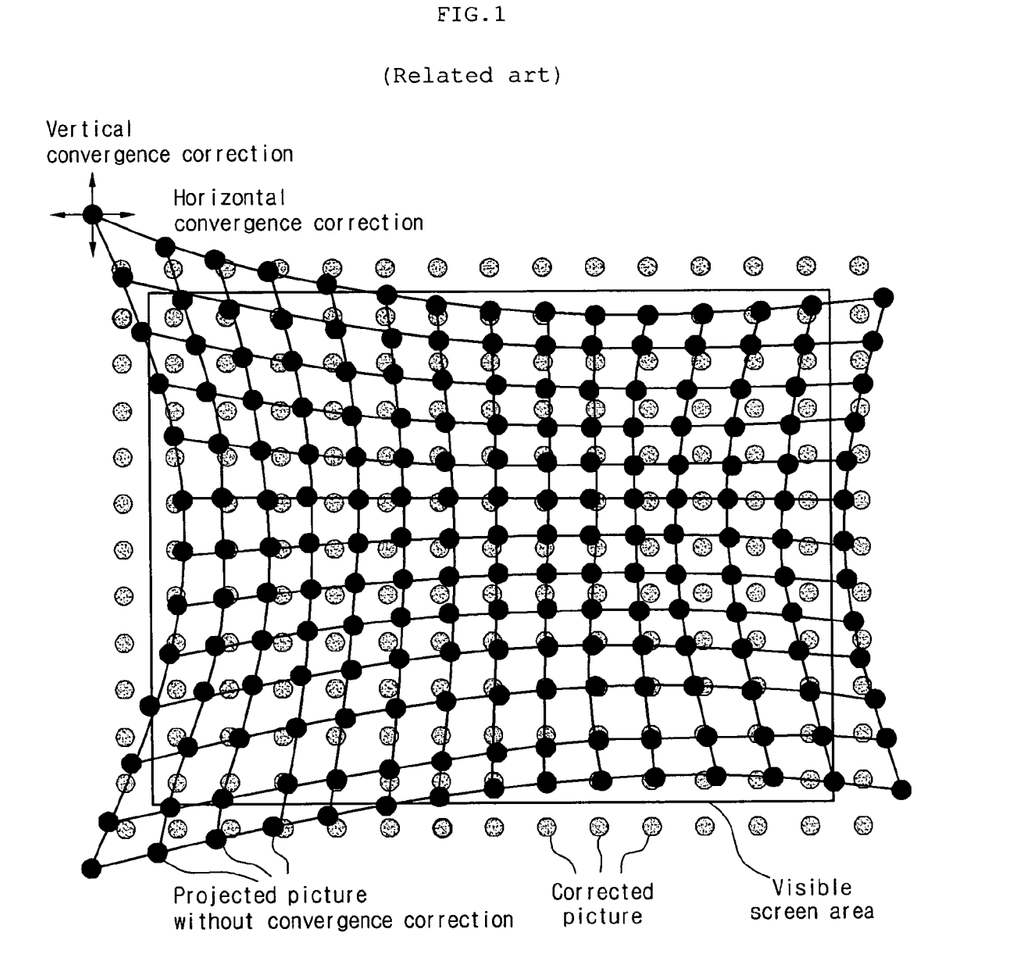
FIG. 1 is a view illustrating a genera mis-convergence screen.

Therefore, in FIG. 1, a projected picture should be properly corrected into a corrected picture as illustrated through a horizontal convergence correction and a vertical convergence correction.

For example, three beams R, G, and B should be exactly gathered onto one single point to be shown as white. If a mis-convergence is generated, a line taking on abnormal other colors such as R, G, and B colors is shown to a side of a white line, which acts as a factor that deteriorates a quality of a screen.

Therefore, a technology in which a user can directly correct a convergence is required.

Recently, for the technology in which a user corrects a convergence, there exist an EZ focus in which a user manually corrects a central portion, an upper portion, a lower portion, a left portion, a right portion, and corner portions of an image displayed on a screen, and an auto-convergence system in which detectors are arranged on a backside of a front cabinet for supporting a screen of a projection TV to detect a degree in which a convergence is distorted and thus automatically correct the convergence.

Here, the auto-convergence system basically generates a predetermined pattern on a screen and recognizes a distortion degree of the convergence using optical sensors and then corrects the distortion.

Recently, with a high-quality trend of a projection TV, the auto-convergence function of the projection TV is commercialized.

A related art projection TV will be described below with reference to the accompanying drawings.

Figure 2A:
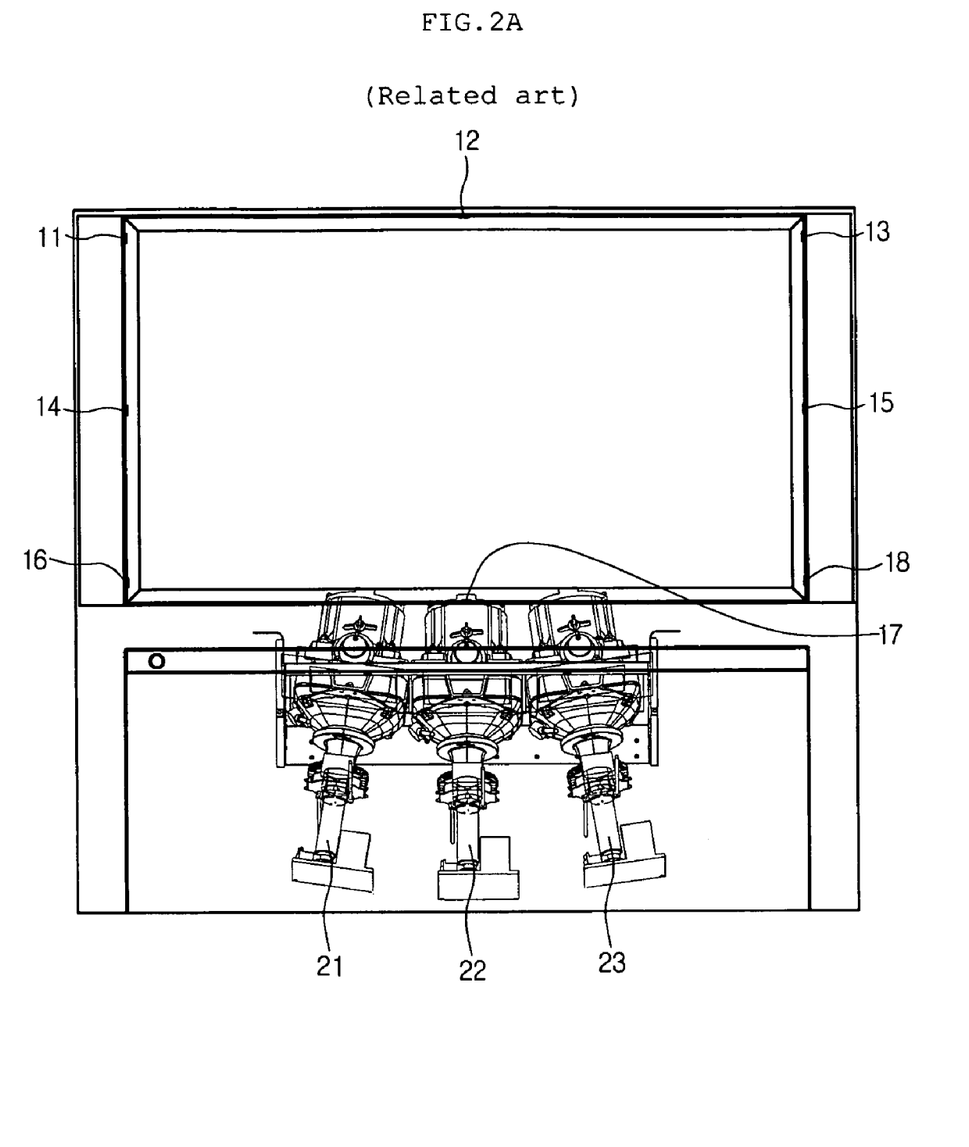
FIGS. 2A and 2B are a front view and a sided view illustrating an optical sensor mounted on a general projection TV, respectively.
Figure 2B:
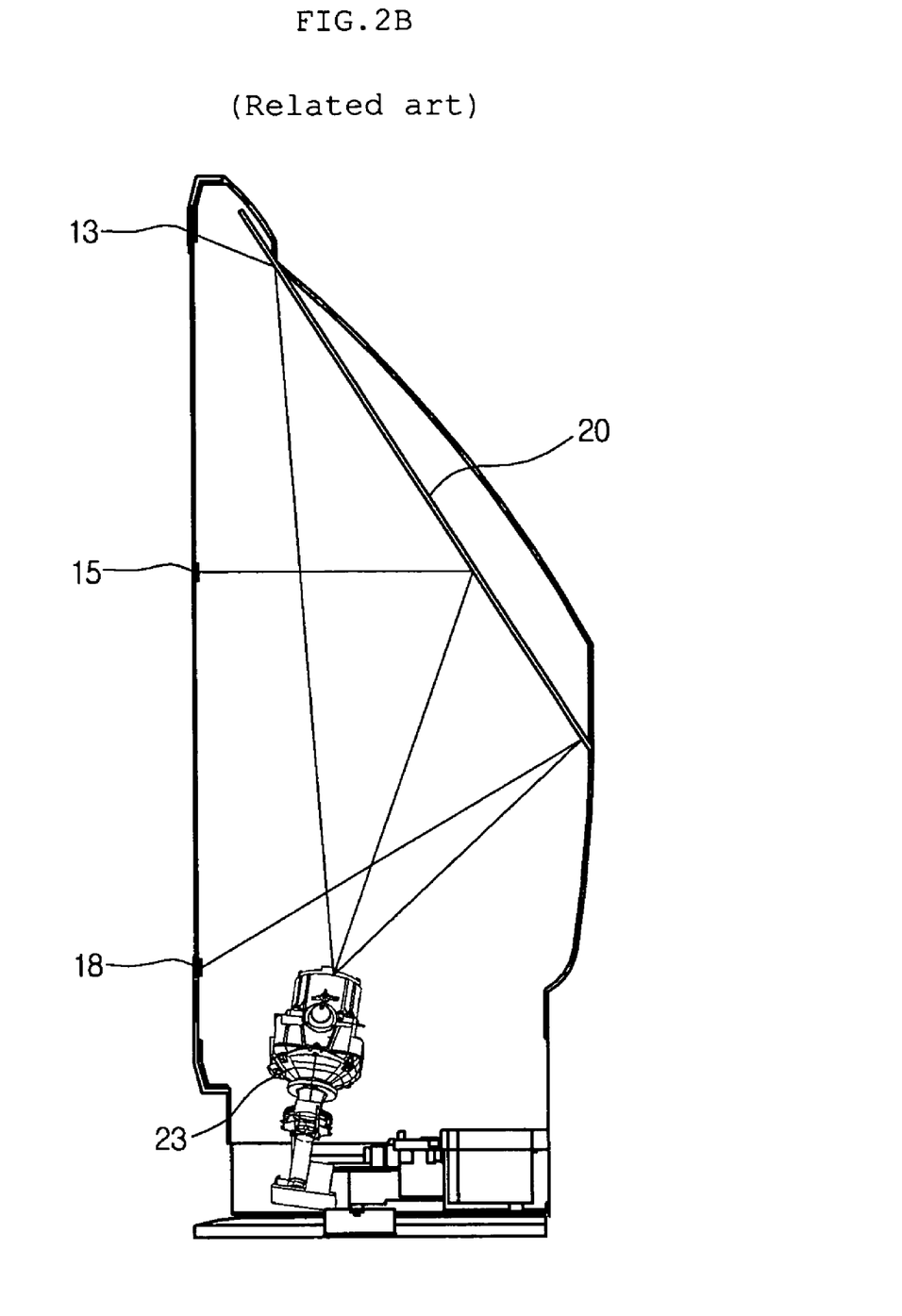
Figure 3:
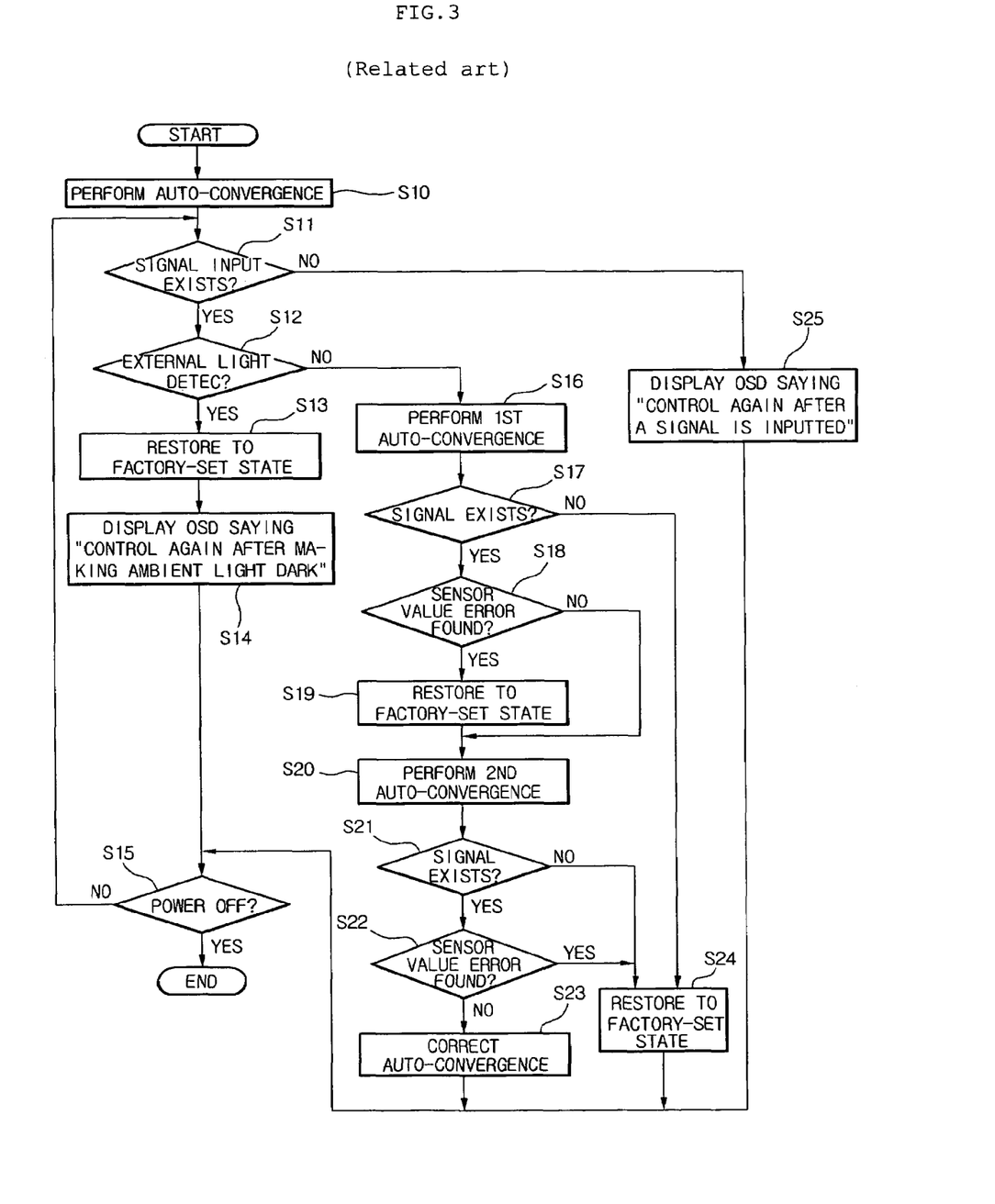
FIG. 3 is a flowchart illustrating a method for performing an auto-convergence of a projection TV according to the related art.

FIG. 1 is a view illustrating a screen in which mis-convergence is generated, FIGS. 2A and 2B are a front view and a sided view illustrating that optical sensors are mounted respectively on a general projection TV, and FIG. 3 is a flowchart illustrating a method for performing an auto-convergence of a projection TV according to the related art.

To perform an auto-convergence function in the projection TV, a first to an eighth optical sensors 11 to 18 are mounted on four corners of up/down/left/right and upper middle/lower middle/left middle/right middle portions around a screen as illustrated in FIG. 2.

Test signals projected from the PRTs 21, 22, and 23 are incident to the first to eighth optical sensors 11 to 18 by way of a reflector 20, so that the auto-convergence is performed using the test signals detected by the first to the eighth optical sensors 11 to 18.

However, since the optical sensors are exposed to an inside of a path of external light in the first to the eighth optical sensors 11 to 18 mounted as described above, there might occur a case that the optical sensors cannot recognize the test signals due to the external light if brightness of the outside of an image display apparatus is bright.

A related art method for controlling an auto-convergence will be described with reference to FIG. 3. First, if an auto-convergence is performed, whether there exists a signal input is judged (S10 and S11).

After that, if the signal input exists as a result of the judgment (S11), whether external light is detected is judged (S12).

If the external light is detected as a result of the judgment (S12), the screen is restored to a factory-set state and an on-screen display (OSD) which says "control again after making ambient light dark" is displayed (S13 and S14).

If a user inputs a power-off command, a system is ended. Otherwise, the initial step S11 is performed (S15).

In the meantime, if the external light is not detected as a result of the judgment (S12), a first auto-convergence is performed (S16).

Subsequently, whether a signal exists is judged (S17).

If the signal exists as a result of the judgment (S17), whether an error is found in a sensor value detected by the first to the eighth optical sensors is judged (S18).

After that, if the error is found in the sensor value as a result of the judgment (S18), a factory-set state is restored and a second auto-convergence is performed (S19 and S20).

Further, whether a signal exists is judged (S21).

If the signal exists, whether an error is found in a sensor value detected by the first to the eighth optical sensors is judged (S22).

After that, if the error is not found in a sensor value as a result of the judgment (S22), an auto-convergence correction is performed (S23).

In the meantime, if a signal does not exist or the error is found in the sensor value as a result of the judgments S17, S21, and S22, a factory-set state is restored and the step S15 is performed (S24).

If a signal input does not exist initially as a result of the judgment (S11), an OSD that says "control again after a signal is inputted" is displayed (S25).

According to a related art image display apparatus, optical sensors are exposed to an inside of a path of the external light, so there might occur a case that the optical sensors cannot recognize a test signal due to the external light when a place where a TV is installed is bright. In that case, there is an inconvenience that the auto-convergence should be performed again after making surroundings sufficiently dark.

SUMMARY OF THE INVENTION

Accordingly, the present invention is directed to an optical sensor that substantially obviates one or more problems due to limitations and disadvantages of the related art.

An object of the present invention is to provide an optical sensor having an external light cut-off unit for cutting off external light incident to the optical sensor for use in an auto-convergence of a projection TV.

Another object of the present invention is to an optical sensor capable of performing an auto-convergence regardless of external brightness.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical sensor, which includes: a plurality of optical sensors positioned in an inside of a projection TV, for receiving test signals; and external light cut-off units protruded to a direction to which the test signals are incident, for cutting off external light incident to the optical sensors.

In another aspect of the present invention, there is provided an optical detector in a projection TV including: a projector for projecting R, G, B images; a reflecting mirror for reflecting the R, G, B images projected from the projector; a screen for displaying the images incident from the reflecting mirror; a front cabinet for supporting the screen, the optical detector, which includes: a plurality of optical sensors formed in edge portions of the screen, for receiving test signals for use in an auto-convergence projected from the projector; and external light cut-off units formed on an outer edge of the optical sensor and having an opening formed in a direction to which the test signals are incident.

In a still another aspect of the present invention, there is provided an optical detector in a projection TV including: three projectors for projecting R, G, B images; a reflecting mirror for reflecting the R, G, B images respectively projected from the projectors; a screen for displaying images incident from the reflecting mirror; and a front cabinet for supporting the screen, the optical detector including: a plurality of optical sensors for receiving test signals for use in an auto-convergence respectively projected from the three projectors; and an external light cut-off unit having an opening, for cutting off external light incident to the optical sensors and allowing the test signals to be incident to the optical sensors.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 4A:
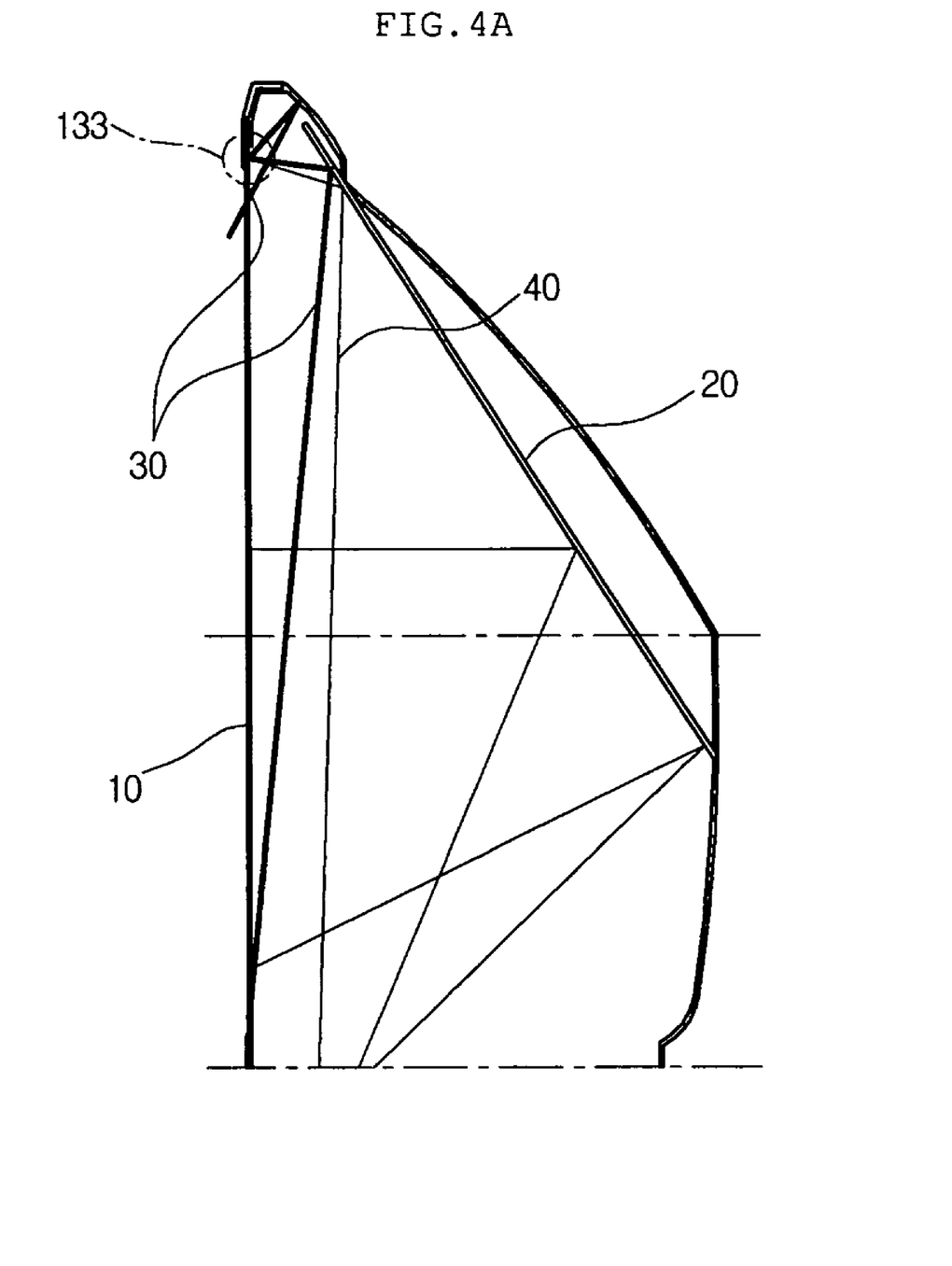
FIGS. 4A to 4C are views explaining an incident angle of external light and a test signal at a third detecting unit.
Figure 4B:
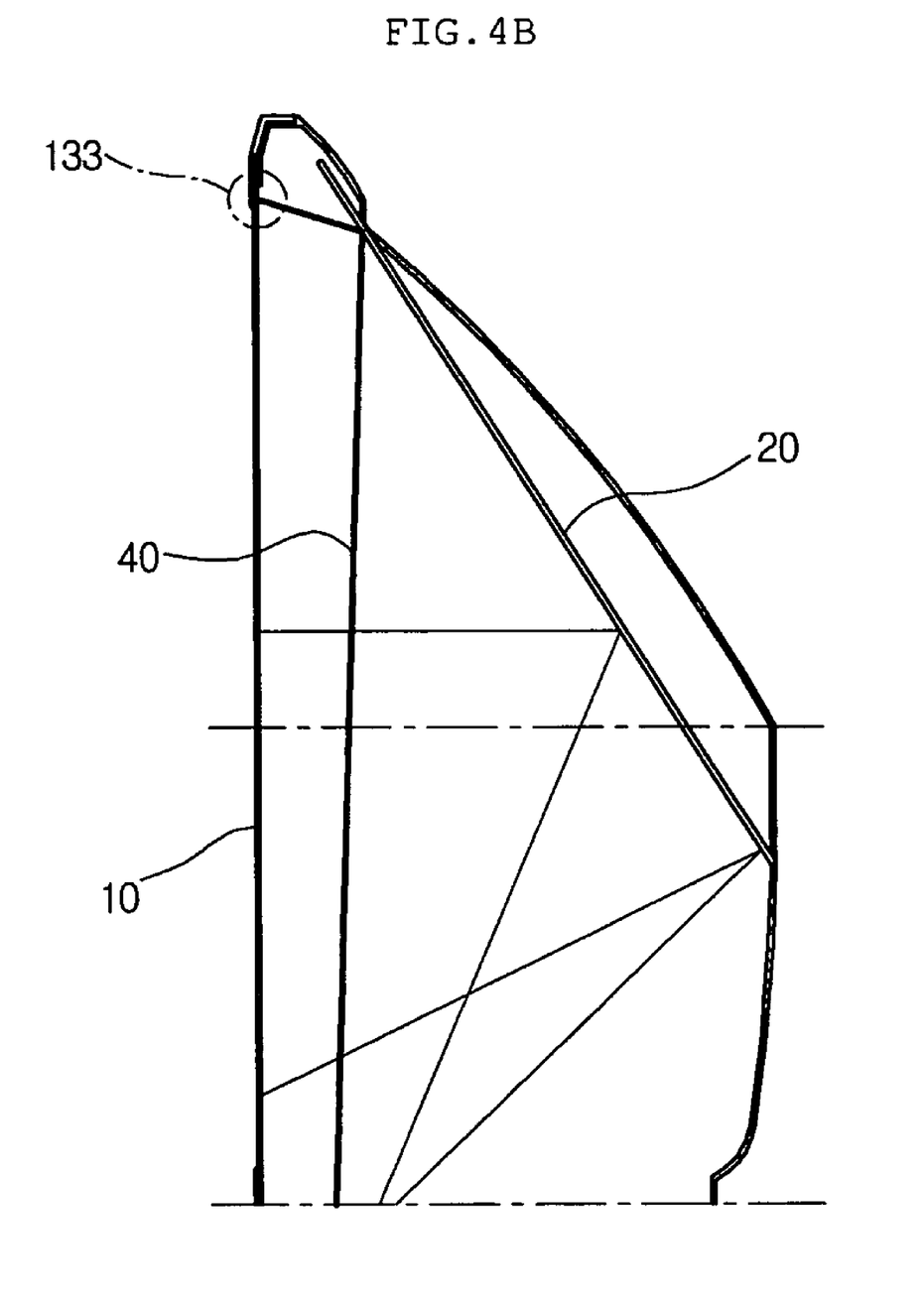
Figure 4C:
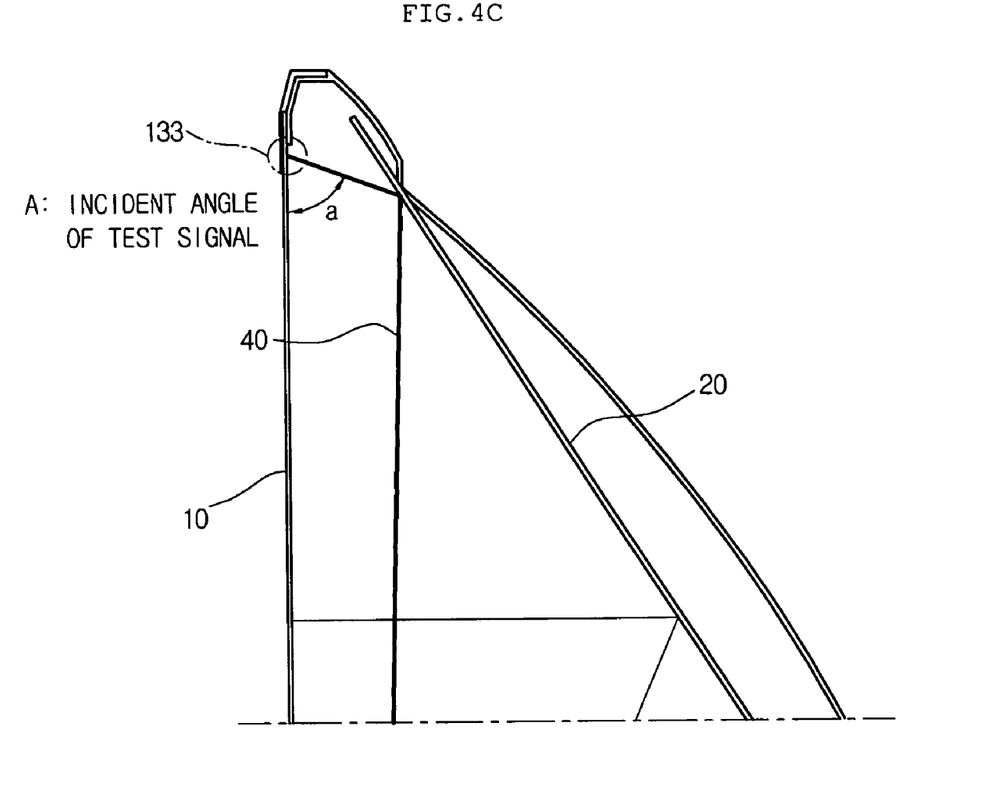
Figure 5A:
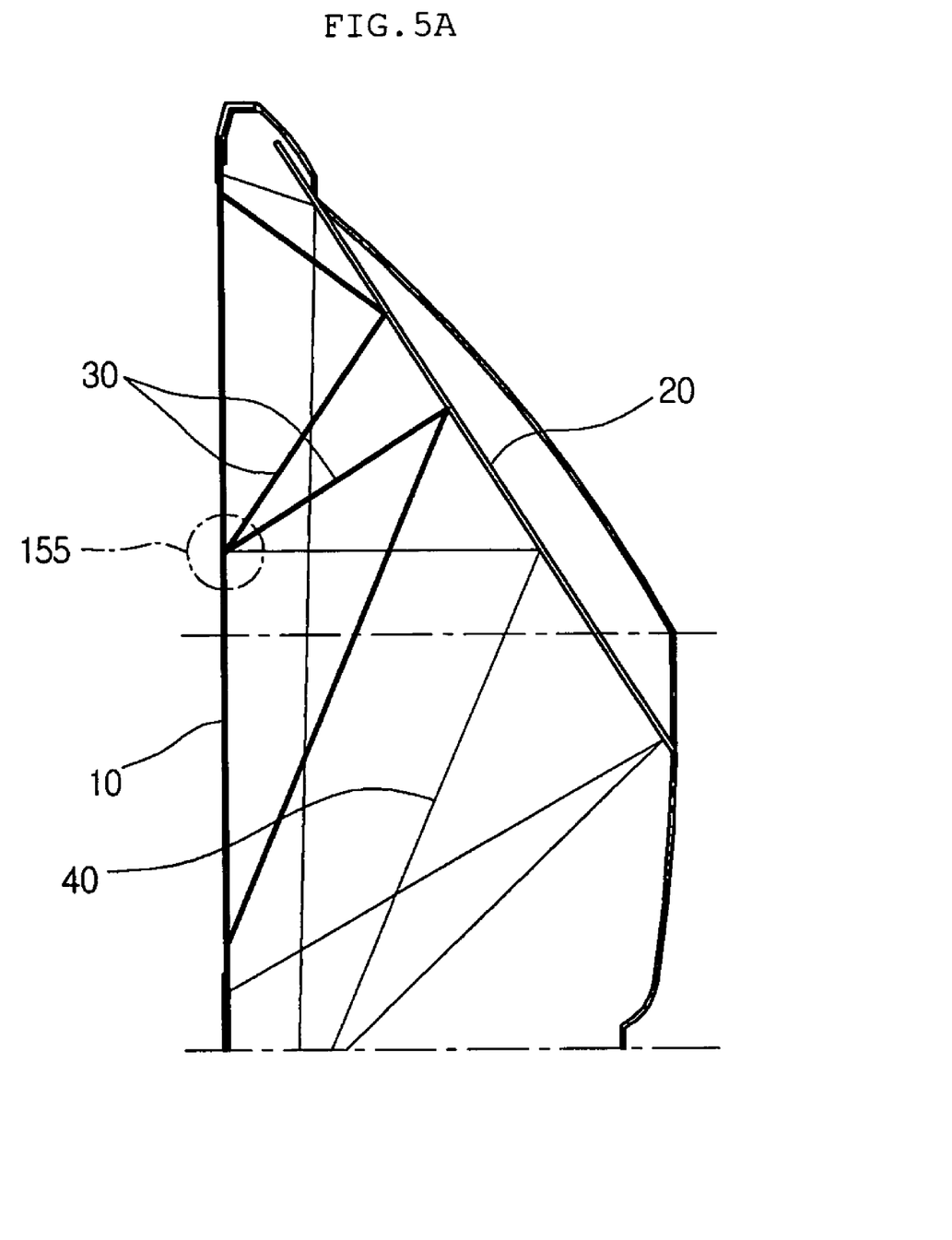
FIGS. 5A to 5C are views explaining an incident angle of external light and a test signal at a fifth detecting unit.
Figure 5B:
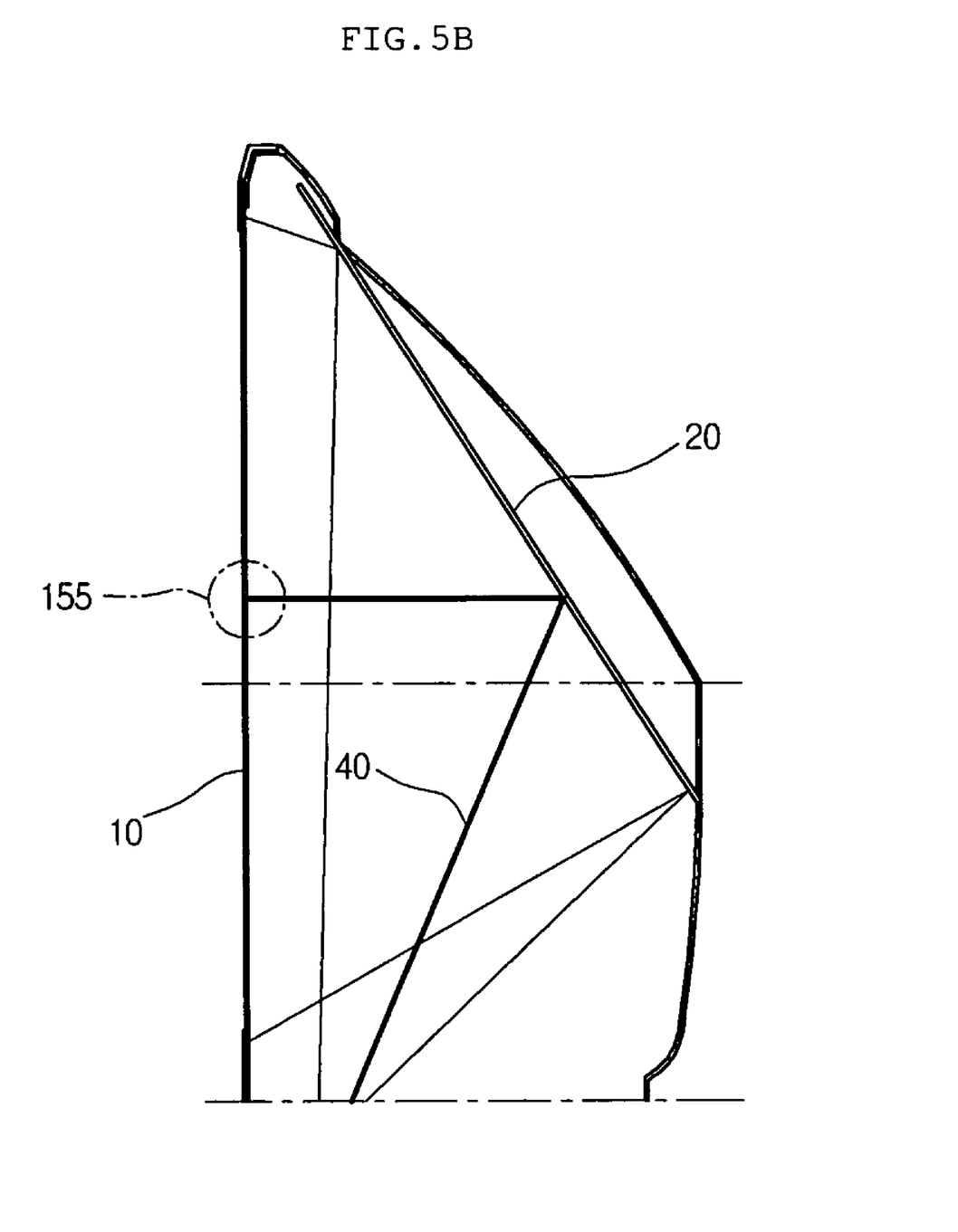
Figure 5C:
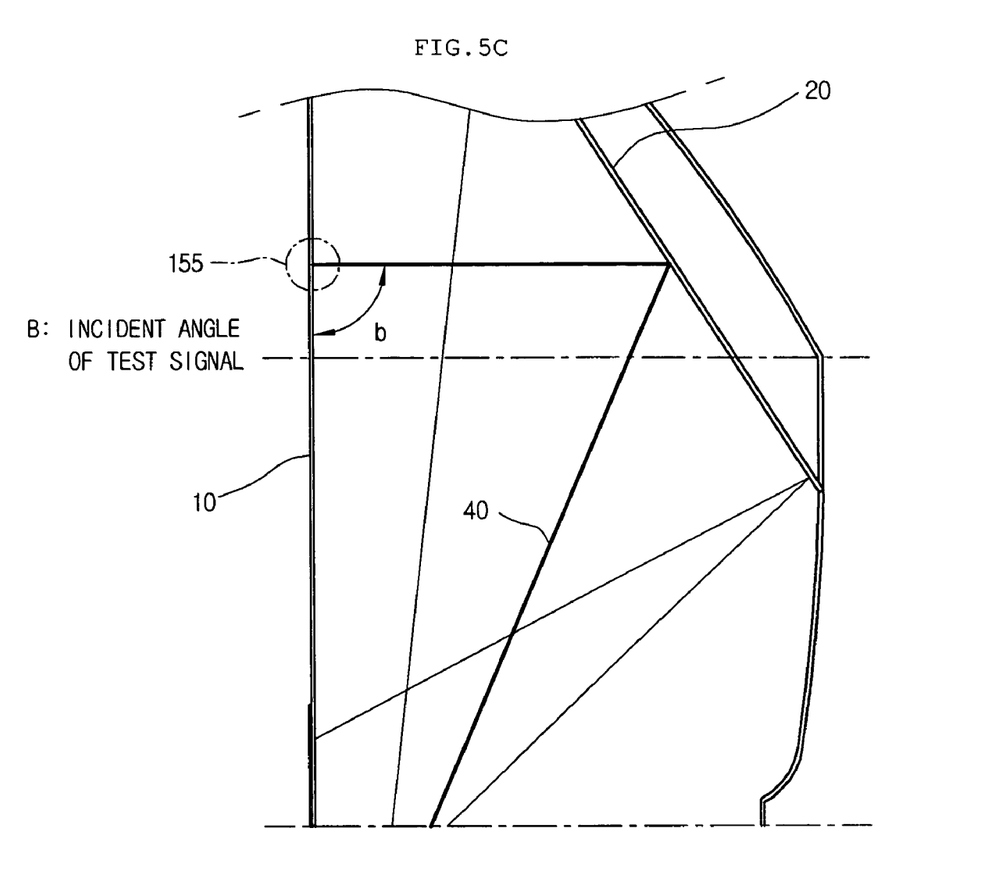
Figure 6A:
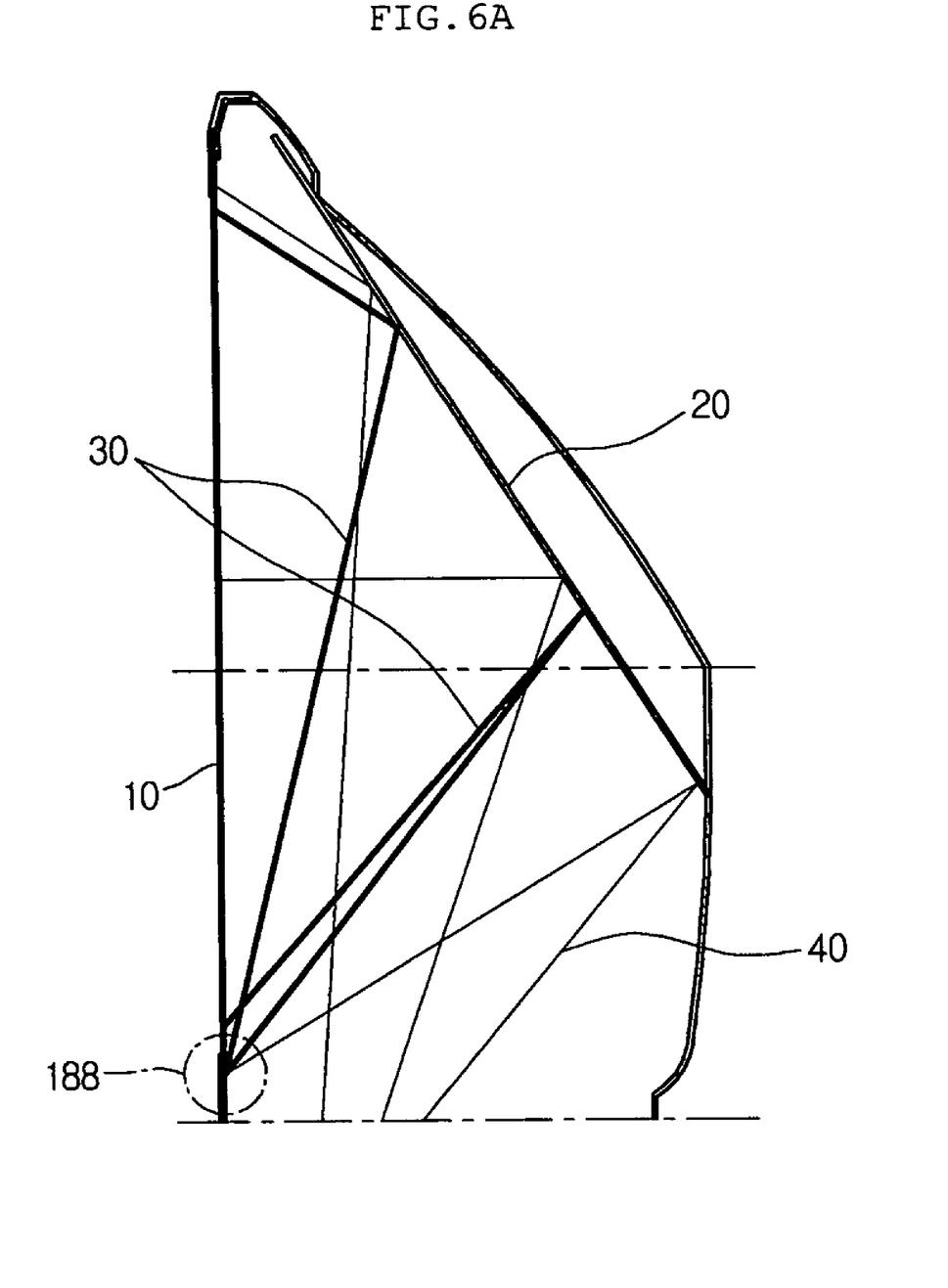
FIGS. 6A to 6C are views explaining an incident angle of external light and a test signal at an eighth detecting unit.
Figure 6B:
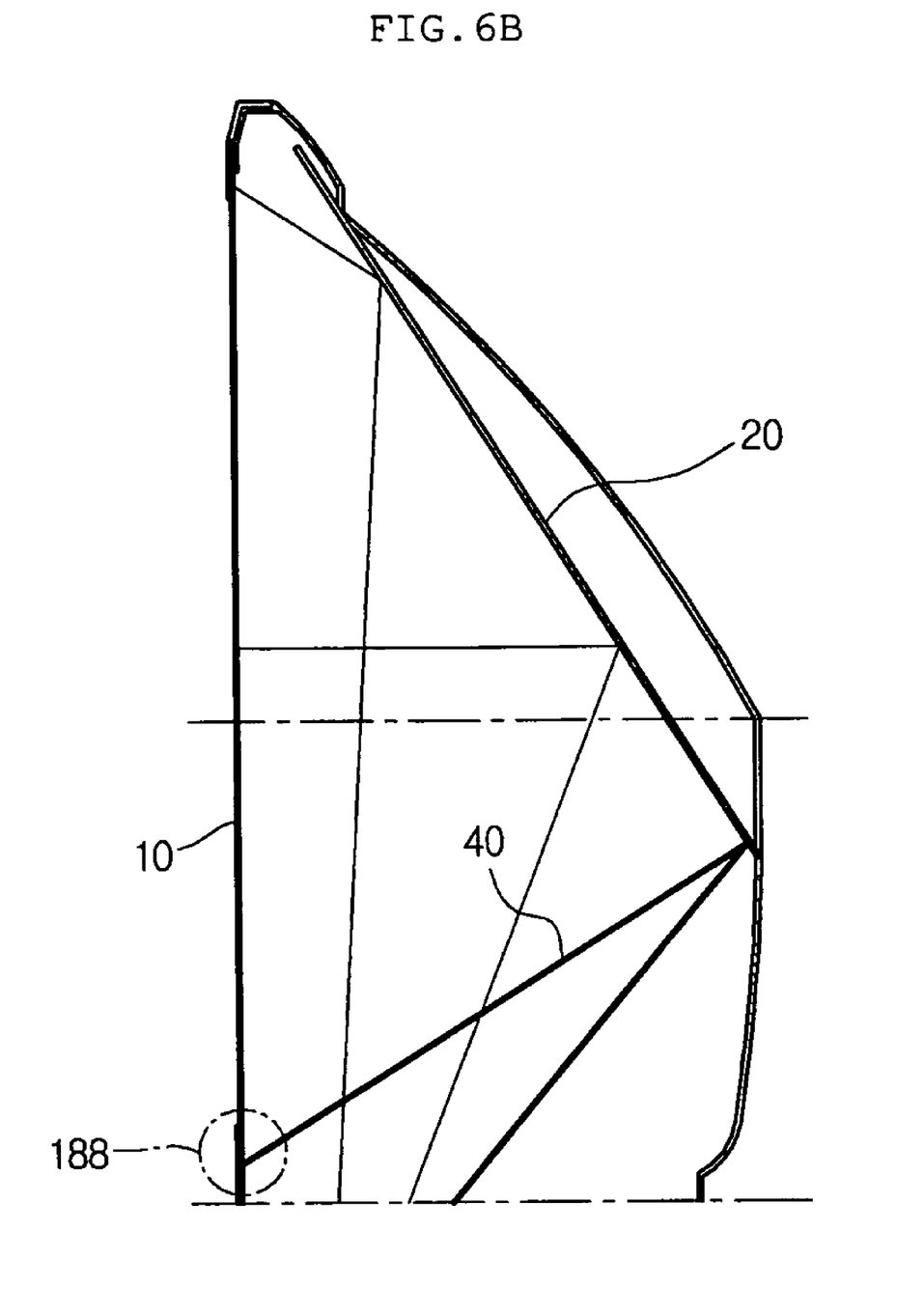
Figure 6C:
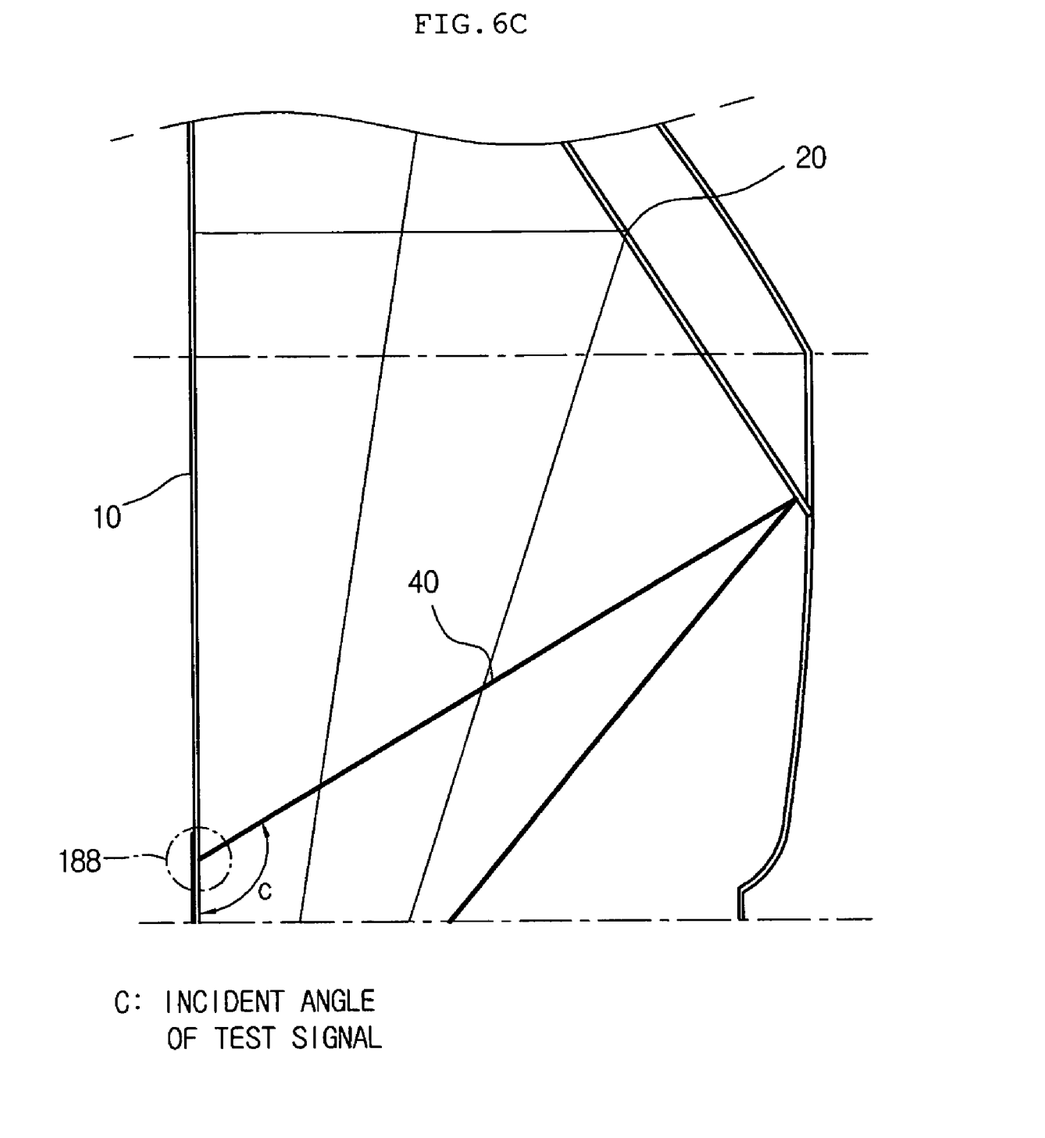
Figure 7:
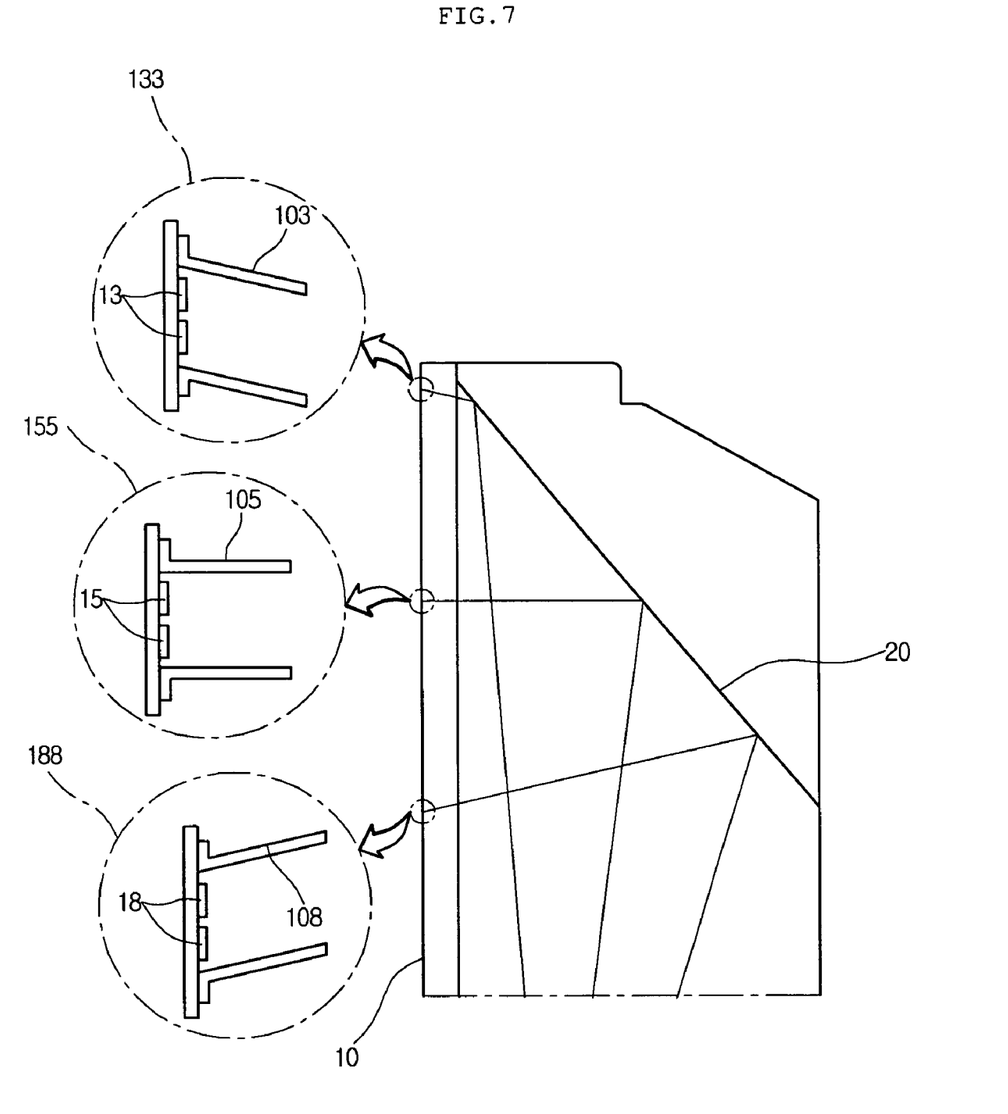
FIGS. 7 and 8 are views explaining an optical detector according to the present invention.
Figure 8:
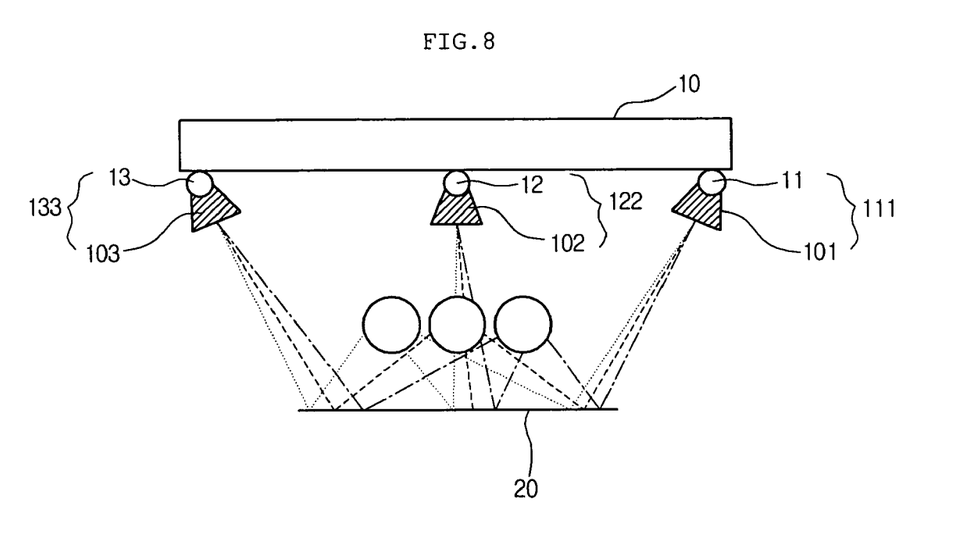

FIGS. 4A to 4C are views explaining that external light and a test signal are incident to a third optical detecting unit, FIGS. 5A to 5C are views explaining that external light and a test signal are incident to a fifth optical detecting unit, FIGS. 6A to 6C are views explaining that external light and a test signal are incident to an eighth optical detecting unit, and FIGS. 7 and 8 are views explaining an optical detector according to the present invention.

The optical detector of the present invention is formed on a backside of a screen in an inside of a projection TV or on a backside of a front cabinet for supporting the screen.

The optical detector includes a plurality of optical detecting units consisting of optical sensors and external light cut-off units for preventing external light from being incident to the optical sensors. Positions and the number of the optical detecting units can be changed.

The optical detecting units may be formed at four corners and up, down, left, right portions around the screen. Four optical detecting units can be formed at up, down, left, right portions around the screen or at four corners around the screen depending on cases.

In FIG. 7, a third optical detecting unit 133, a fifth optical detecting unit 155, and an eighth optical detecting unit 188 vertically arranged are illustrated. In FIG. 8, a first optical detecting unit 111, a second optical detecting unit 122, and the third optical detecting unit 133 horizontally arranged are illustrated.

First, an optical detector according to the present invention will be described below with reference to FIG. 7.

Referring to FIG. 7, a screen 10 for displaying R, G, B image signals is provided and a plurality of optical detecting units 133, 155, and 188 are formed at a predetermined region of a front cabinet for supporting the screen 10 or at a predetermined region of the screen 10.

The optical detecting units 133, 155, and 188 are intended for detecting test signal patterns displayed on the screen 10. For the optical detecting units, the third optical detecting unit 133, the fifth optical detecting unit 155, and the eighth optical detecting unit 188 respectively mounting two optical sensors 13, 15, and 18 are provided.

In addition, external light cut-off units 103, 105, and 108 for cutting off external light incident to the optical sensors 13, 15, and 18 are formed in a predetermined angle on an outer surface of the optical sensors 13, 15, and 18.

In addition, the screen further includes a first, a second, a fourth, a sixth, and a seventh optical detecting units (not shown) besides the third, the fifth, and the eighth optical detecting units 133, 155, and 188. In FIG. 7, description will be made only for the third, the fifth, and the eighth optical detecting units 133, 155, and 188.

Since the optical detector is designed to prevent external light coming to a front side of the projection TV and reflected by a reflecting mirror 20, from being incident to the third, the fifth, and the eighth sensors 13, 15, and 18, the external light cut-off units 103, 105, and 108 have predetermined incident angle ranges for the respective optical detecting units 133, 155, and 188.

That is, incident angles of test signals generated upon functioning of an auto-convergence which is performed by the projection TV itself have the predetermined angles for the respective third, fifth, and eighth optical detecting units 133, 155, and 188.

Referring to FIGS. 4A and 4B, chief external light 30 and a test signal 40 incident to the third optical detecting unit 133 have different incident angles each other. Further, referring to FIG. 4C, the test signal 40 is reflected by the reflecting mirror 20 and incident to the third optical detecting unit 133 with an incident angle a.

Referring to FIGS. 5A and 5B, chief external light 30 and a test signal 40 incident to the fifth optical detecting unit 155 have different incident angles each other. Further, referring to FIG. 5C, the test signal 40 is reflected by the reflecting mirror 20 and incident to the fifth optical detecting unit 155 with an incident angle b.

Referring to FIGS. 6A and 6B, chief external light 30 and a test signal 40 incident to the eighth optical detecting unit 188 have different incident angles each other. Further, referring to FIG. 6C, the test signal 40 is reflected by the reflecting mirror 20 and incident to the eighth optical detecting unit 188 with an incident angle c.

Therefore, as illustrated in FIG. 7, the optical detector is designed to cut off the external light 30 by mounting the external light cut-off units 103, 105, and 108 that face incident directions of the test signals 40 on the positions of the respective optical detecting units.

More specifically, the external light cut-off units 103, 105, and 108 are of a cylindrical, a conical or a tub shapes having an angle. When seen from sides of the third, the fifth, and the eighth optical detecting units 133, 155, and 188, portions to which the external light 30 except the test signals 40 is incident is cut off by the external light cut-off units 103, 105, and 108.

That is, the external light cut-off units 103, 105, and 108 have an opening formed in a direction to which the test signals 40 are incident, so that the external light 30 except the test signals 40 may be cut off.

FIG. 8 is a view explaining that the test signals are incident to the first to the third optical detecting units among the first to the eighth optical detecting units.

Referring to FIG. 8, in the optical detector, incident angles are all different with respect to the respective light sources R, G, and B reflected by and incident from the reflecting mirror 20.

That is, the first to the third external light cut-off units 101, 102, and 103 are formed on outer surfaces of the first to the third optical detecting units 111, 122, and 133 that correspond to incident angle ranges for receiving all the three light sources.

As described above, the optical detector of the projection TV can sufficiently cut off the external light and swiftly detect the test signals by forming the external light cut-off units for cutting off the external light that might be incident to a plurality of optical sensors for detecting the test signals.

Further, cross sections, lengths of the tub and angles of the external light cut-off units may be differently formed for the respective projection TV models, for optical sensors' sizes are different depending on the projection TV models.

As described above, the optical detector of the projection TV has the following effects.

First, it is possible to prevent in advance a phenomenon that the external light is incident to an inside of the TV through the screen and reflected by the reflecting mirror and a body portion to stimulate the optical sensors.

Second, since cutting-off of the external light can be achieved, a recognition rate of the test signals can be increased when the auto-convergence function is performed.

Third, an auto-convergence error that would be generated depending on brightness of ambient light can be reduced and the auto-convergence can be more swiftly performed compared with the related art and a higher success rate can be expected.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical sensor comprising:
a plurality of optical sensors positioned on an inside front of a television, and configured to receive test signals; and
a plurality of cut-off devices, each being provided adjacent to at least one corresponding optical sensor and having a prescribed shape and at least one wall protruding in a direction toward a rear of a television, wherein at least one wall of at least one cut-off device is oriented toward a top or a bottom of a projection television.

2. The optical sensor according to claim 1, wherein the optical sensors are formed on a screen in the inside front of the projection television.

3. The optical sensor according to claim 1, wherein the television is a projection TV and the optical sensors are formed on an inner surface of a front cabinet for supporting a screen of the projection television.

4. The optical sensor according to claims 1, wherein the optical sensors are formed on at least four points of the projection television.

5. The optical sensor according to claim 1, wherein the optical sensors are formed at up/down/left/right portions, respectively, around a screen provided to the projection television.

6. The optical sensor according to claim 1, wherein the optical sensors are formed at four corners around a screen provided to the projection television.

7. The optical sensor according to claim 1, wherein the light cut-off devices are formed in a cylindrical shape, and the at least one wall provides an opening in an incident direction of the test signals.

8. The optical sensor according to claim 1, wherein the cut-off devices are formed in a tub shape and the at least one wall provides an opening in an incident direction of the test signals.

9. The optical sensor of claim 1, where a television is a projection television (TV) having:
a projector for projecting R, G, B images;
a reflecting mirror for reflecting the R, G, B images projected from the projector;
a screen for displaying the images incident from the reflecting mirror;
and a front cabinet for supporting the screen, wherein the plurality of optical sensors are formed on edge portions of the screen, and the test signals are used for auto-convergence and are projected from the projector, and the cut-off devices are formed on an outer edge of the optical sensors and the at least one wall provide an opening in a direction to which the test signals are incident.

10. The optical sensor of claim 9, wherein the at least one wall is further oriented toward a center of a projection television.

11. The optical sensor of claim 9, wherein cut-off devices allow the test signals to be incident on the sensors and prevent external light from reaching the optical sensors.

12. The optical sensor of claim 10, wherein the at least one cut-off device comprises a first cut-off device provided near a top front of a television screen, and the at least one wall of the first cut-off device is oriented toward the bottom of the projection television.

13. The optical sensor of claim 12, wherein the at least one cut-off device further comprises a second-cut off device provided near a bottom front of a television screen, and the at least one wall of the second cut-off device is oriented toward the top of the projection television.

* * * * *